United States Patent
Ponting et al.

(10) Patent No.: US 9,602,666 B2
(45) Date of Patent: Mar. 21, 2017

(54) SILENCE DENSITY MODELS

(71) Applicant: Avaya Inc., Santa Clara, CA (US)

(72) Inventors: Keith Ponting, West Malvern (GB); Wendy J Holmes, Malvern (GB); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 22 days.

(21) Appl. No.: 14/682,312

(22) Filed: Apr. 9, 2015

(65) Prior Publication Data
US 2016/0301803 A1 Oct. 13, 2016

(51) Int. Cl.
- H04M 3/00 (2006.01)
- H04M 5/00 (2006.01)
- H04M 3/51 (2006.01)

(52) U.S. Cl.
CPC ...... H04M 3/5175 (2013.01); *H04M 2201/41* (2013.01); *H04M 2203/402* (2013.01)

(58) Field of Classification Search
CPC ....... H04M 2201/40; H04M 2203/401; H04M 3/51; H04M 3/5175; H04M 3/523; H04M 2203/355
USPC ...... 379/265.07, 265.06, 265.05, 188, 266.1, 379/265.01
See application file for complete search history.

(56) References Cited

U.S. PATENT DOCUMENTS

| | | | |
|---|---|---|---|
| 6,076,057 A | 6/2000 | Narayanan et al. | |
| 6,606,594 B1 | 8/2003 | Sejnoha et al. | |
| 7,457,404 B1 * | 11/2008 | Hession | G10L 15/26 379/265.07 |
| 7,961,860 B1 * | 6/2011 | McFarlen | H04M 3/38 379/188 |
| 8,233,610 B2 | 7/2012 | Erhart et al. | |
| 8,244,531 B2 | 8/2012 | Erhart et al. | |
| 8,934,618 B2 * | 1/2015 | Costello | G10L 15/22 379/265.12 |
| 9,258,421 B2 | 2/2016 | Matula et al. | |
| 9,420,100 B2 * | 8/2016 | Bellini | H04M 3/5175 |
| 2014/0140497 A1 * | 5/2014 | Ripa | H04M 3/5133 379/265.06 |
| 2015/0302868 A1 | 10/2015 | Sikveland et al. | |
| 2015/0364130 A1 | 12/2015 | Ponting et al. | |

* cited by examiner

*Primary Examiner* — Thjuan K Addy
(74) *Attorney, Agent, or Firm* — Sheridan Ross P.C.

(57) ABSTRACT

An event associated with a communication session between a first party and a second party is detected. The event is related to the communication session. For example, the event may be a phrase spoken in the communication session or a presentation of a call progression screen to a contact center agent. At this point, the communication session is analyzed for a period of non-communication that meets a defined threshold during a monitoring period associated with the event. If a period of non-communication is detected that is longer than the threshold during the monitoring period, the period of non-communication is flagged. The flagged period of non-communication can then be used to evaluate how a contact center agent is performing.

20 Claims, 5 Drawing Sheets

SILENCE DENSITY MODELS

TECHNICAL FIELD

The systems and methods disclosed herein relate to communication systems and in particular to monitoring of silence in electronic voice communications.

BACKGROUND

Silence, in the field of telecommunications, is the lack of sound in a voice communication session (e.g., an absence of communication). In most conversations, short absences of speech can suggest boundaries and turn-taking. The absence of communication may not actually be without sound. Absence of communication can also include background noise (e.g., paper rustling, typing) or music on hold.

Many companies have developed ways to measure silence for contact center calls in order to manage a metric known as Average Handling Time (AHT). Contact center agents found to have high AHTs are often subject to review and corrective action, especially if the calls handled by the agent have long periods of silence.

While effective to some degree, the current AHT models do not account for calls that, by their nature, will have measurable periods of non-communication. For example, if a contact center agent asks a customer to perform an action that may require the customer to put the phone down for a period of time (e.g., to reset a modem), the contact center agent can be penalized for AHT and lack of communication; the penalty occurs even though the actions taken by the contact center agent and the resulting silence are necessary for servicing the contact center call.

SUMMARY

Systems and methods are provided to solve these and other problems and disadvantages of the prior art. An event associated with a communication session between a first party and a second party is detected. The event is related to the communication session. For example, the event may be a phrase spoken in the communication session or a presentation of a call progression screen to a contact center agent. At this point, the communication session is analyzed for a period of non-communication that meets a defined threshold during a monitoring period associated with the event. If a period of non-communication is detected that is longer than the threshold during the monitoring period, the period of non-communication is flagged. The flagged period of non-communication can then be used to evaluate how a contact center agent is performing.

DETAILED DESCRIPTION

Figure 1:
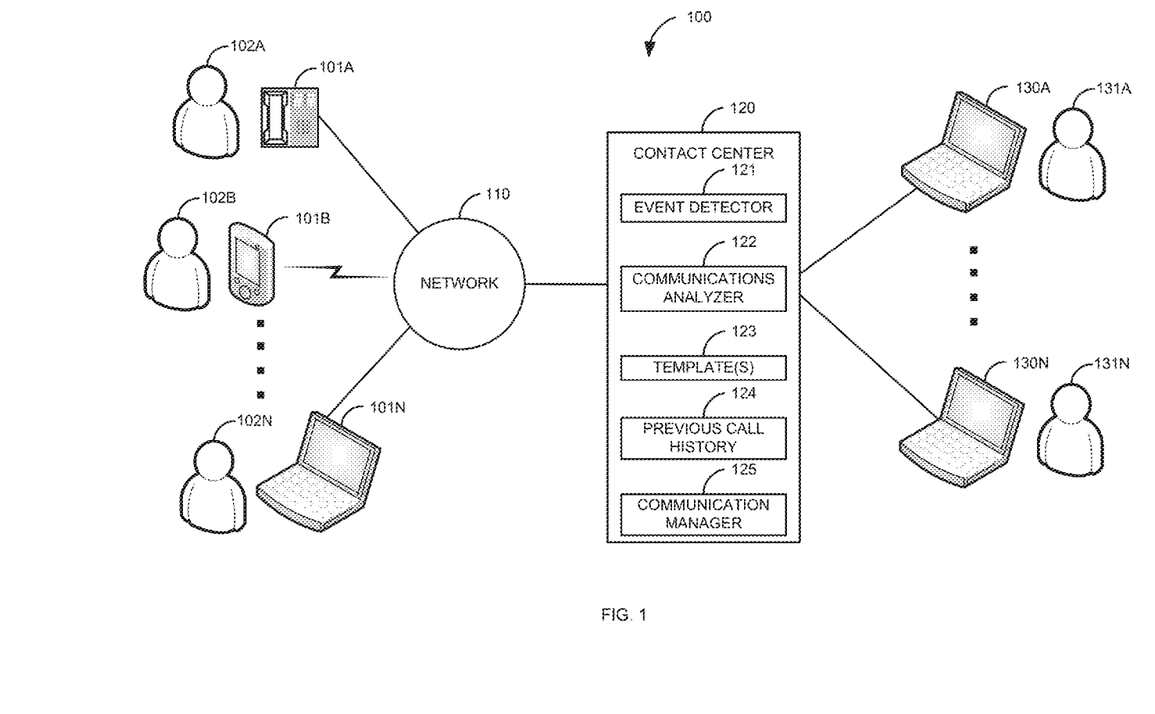
FIG. 1 is a block diagram of a first illustrative system 100 for managing periods of non-communication in an electronic communication session.

FIG. 1 is a block diagram of a first illustrative system 100 for managing periods of non-communication in an electronic communication session. The first illustrative system 100 comprises communication endpoints 101A-101N, a network 110, a contact center 120, and agent terminals 130A-130N.

In addition FIG. 1 includes users 102A-102N and contact center agents 131A-131N. The users 102A-102N can be any person who initiates or receives an electronic voice communication (i.e., a voice or video communication) directed to or from the communication endpoints 101A-101N. The contact center agents 131A-131N are also persons who initiate or receive electronic voice communications directed to or from the agent terminals 130A-130N. In one embodiment, the electronic voice communications can be initiated by an auto dialer (not shown). The users 102A-102N and the contact center agents 131A-131N can all be parties to an electronic voice communication session, such as a point-to-point communication session or a conference.

The communication endpoint 101 can be or may include any device that a user 102 can use to communicate on the network 110, such as a Personal Computer (PC), a telephone, a video phone, a cellular telephone, a Personal Digital Assistant (PDA), a tablet device, a notebook device, and the like. As shown in FIG. 1, any number of communication endpoints 101A-101N may be connected to the network 110, including only a single communication device 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), Plain Old Telephone Service (POTS), H.323, video protocols, and/or the like. Thus, the network 110 is an electronic communication network configured to carry messages via packets and/or circuit switched communications.

The contact center 120 comprises an event detector 121, a communications analyzer 122, template(s) 123, a previous call history 124, and a communication manager 125. Although the contact center elements 121-125 are shown as part of the contact center 120, the elements 121-125 may be distributed within the network 110. The system of FIG. 1 shows the use of the contact center 120. However, in other embodiments, the use of the contact center 120 is not necessary. For example, electronic voice communications between two or more users 102 can be monitored for periods of non-communication in a non-contact center environment.

The event detector 121 can be or may include any hardware/software that can detect events. The event detector 121 can detect various kinds of events in various ways. For example, the event detector 121 can detect events that occur in an electronic voice communication session, events that occur in an associated video stream of an electronic voice communication session, events that are related to a state of a call (e.g., a call transfer or mute), events that are related to what a contact center agent 131 is doing, presence events of a user 102 and/or contact center agent 131 (prior to establishing the electronic voice communication session), and/or the like.

The communications analyzer 122 can be any hardware used in conjunction with software that can analyze an electronic voice communication session, such as a digital signaling processor, a processor, a microprocessor, an Application Specific Integrated Circuit (ASIC), and/or the like. The communications analyzer 122 can analyze the electronic voice communication session for periods of non-communication.

The template(s) 123 can be any data structure or combination of data structures associated with one or more events. The template 123 is used by the communications analyzer 122 to define where periods of non-communication can occur in an electronic voice communication session. The period of non-communication may comprise a range (i.e., a threshold). For example, the period of non-communication in a specific part of an electronic voice communication session may range from 20 to 60 seconds depending on an action taken by a user 102.

The previous call history 124 can include information gathered from previous calls. For example, the previous call history 124 can include detected periods of non-communication in previous calls. The communications analyzer 122 uses the detected periods of non-communication to identify patterns in calls (models). For example, if at a specific point in a call for product X typically has a period of non-communication (e.g., when the contact center agent 131 asks the user 102 to make sure that product X is plugged in), then the previous call history 124 can capture this information. Likewise, the previous call history 124 can contain information of where periods of non-communication are not typically found. The captured periods of non-communication/communication are used to define/create the template(s) 123.

The communication manager 125 can be, or may include any hardware/software that can establish an electronic voice or video communication session, such as a Private Branch Exchange (PBX), a network switch, a session manager, a central office switch, and/or the like. The communication manager 125 can establish electronic voice/video communications sessions between the users 102A-102N and/or the contact center agents 131A-131N.

The agent terminals 130A-130N can be any communication device that the contact center agent 131 can use to service the electronic voice communication session. For example, the agent terminal 130 may be a communication endpoint 101. The agent terminal 130 may comprise multiple devices, such as a telephone and a personal computer. In FIG. 1, the agent terminals 130A-130N are shown directly connected to the contact center 120. However, in other embodiments, the agent terminals 130A-130N can be connected to the contact center via the network 110 or via a separate network (not shown).

Figure 2:
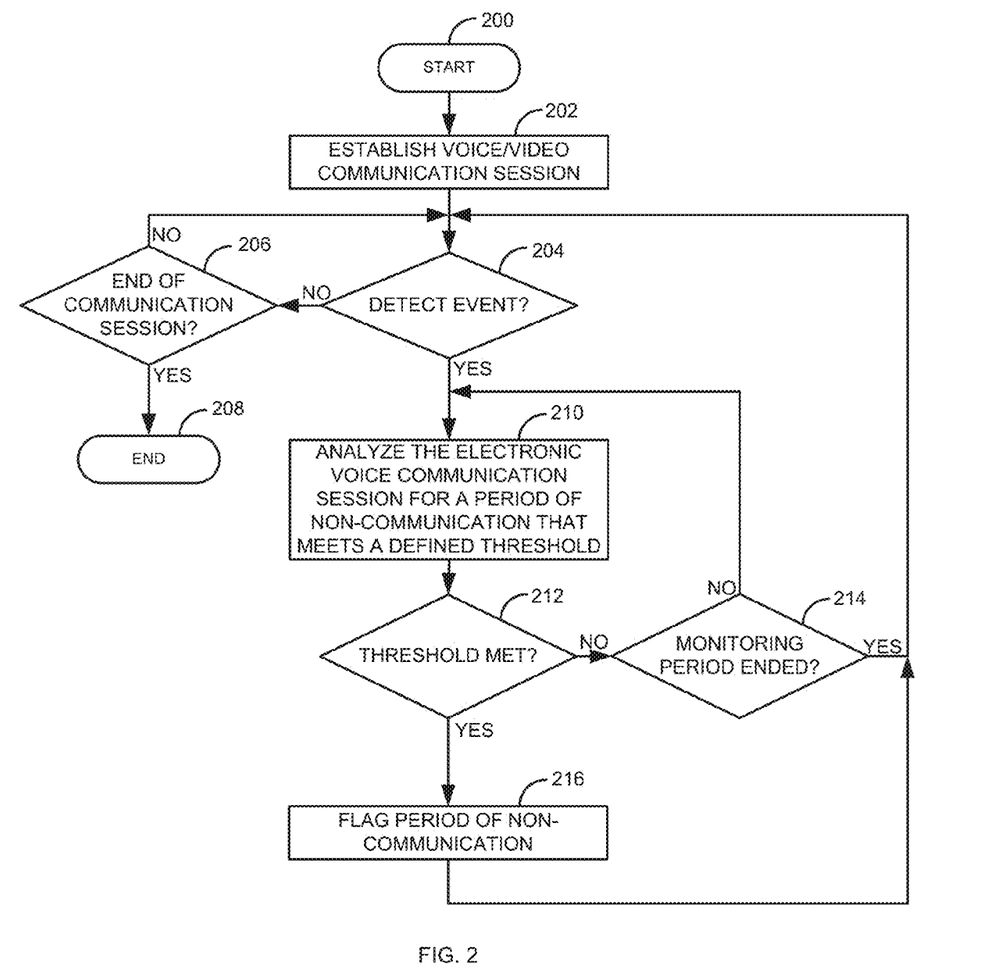
FIG. 2 is a flow diagram of a process for managing periods of non-communication in an electronic communication session.

FIG. 2 is a flow diagram of a process for managing periods of non-communication in an electronic communication session. Illustratively, the communication endpoints 101A-101N, the contact center 120, the event detector 121, the communication analyzer 122, the communication manager 125, and the agent terminals 130A-103N are stored-program-controlled entities, such as a computer or processor, which performs the method of FIGS. 2-5 and the processes described herein by executing program instructions stored in a non-transitory computer readable storage medium, such as a memory or disk. Although the methods described in FIGS. 2-5 are shown in a specific order, one of skill in the art would recognize that the steps in FIGS. 2-5 may be implemented in different orders and/or be implemented in a multi-threaded environment. Moreover, various steps may be omitted or added based on implementation.

The process starts in step 200. An electronic voice or video (with voice) communication session is established in step 202 by the communication manager 125. The electronic voice communication session can include two or more parties (e.g., users 102A-102N/contact center agents 131A-131N). For example, the electronic voice communication session may comprises a conference call from two or more users 102 (e.g., user 102A and 102B) to the contact center agent 131A. Alternatively the electronic voice communication session may comprise two or more contact center agents 131 (e.g., contact center agents 131A and his/her supervisor 131N) and the user 102A. In one embodiment, the electronic voice communication session may comprise a plurality of users 102 and a plurality of contact center agents 131.

The event detector 121 determines in step 204 if an event has been detected. An event can be any event associated with an electronic communication session. The event may be based on information in the electronic voice communication itself. For example, the event can be the detection of a word or phrase spoken by a party in the electronic voice communication session. If the user 102 says the phrase "can I put you on hold," the event detector 121 in conjunction with the communications analyzer 122 can identify the phrase "can I put you on hold" as an event. Another event that may be part of the electronic voice communication session may be based on the detection of music on hold. The event detector 121 in conjunction with the communications analyzer 122 can detect the presence of music being played to indicate that the user 102 may no longer be listening to the electronic voice communication session.

The event may be based on a state of the electronic voice communication session. For example, the event may be the detection of a party muting their telephone, detection of the electronic voice communication being transferred from one party to another party, detection of call forking, detection of call forwarding, detection of conferencing an additional party, and/or the like.

The event may be based on an associated video stream. For example, the event may be the detection of a party walking away from a video phone, detection of a gesture by a party, detection of a party shaking their head, detection of a party waving his/her hand(s), detection of a party not moving their lips, and/or the like.

The event may be based on what the contact center agent 131 is doing. For example, the event may be based on a point in a script being read by a contact center agent 131. A script is what a contact center agent 131 reads to the user 102 when a specific type of call is being handled. In one embodiment, the script may comprise different screens that are presented to the contact center agent 131 as the call progresses. In this case, the event may be based on a specific call progression screen being presented to a contact center agent 131.

In other embodiments, the event may be an event that occurs at the start or prior to the start of the electronic voice communication session, such as, when the electronic voice communication is established, when the contact center agent 131 or user 102 starts talking, when the incoming call is connected to a non-human entity, such as an Interactive Voice Response (IVR) system, when a party becomes available, and/or the like. For example, the event may be when the user 102 is connected to an IVR system to determine if a user 102 has any long periods of non-communication when responding to individual IVR prompts. This information can be used to modify the IVR prompts.

If an event is not detected in step 204, the process goes to step 206 to determine if the electronic voice communication session has ended. If the electronic voice communication session has ended in step 206, the process ends in step 208. Otherwise, if the electronic voice communication session has not ended in step 208, the process goes to step 204.

If the event has been detected in step 204, the communications analyzer 122 analyzes the electronic voice communication session for a period of non-communication that meets a defined threshold in step 210. In normal voice communications, periods of non-communication typically occur when the conversation transitions between parties. Short periods of non-communication are therefore necessary for normal communications. However, based on the context of the electronic voice communication session, a period of non-communication longer than the normal transition period (e.g., 2-3 seconds longer than the normal transition period) may indicate that there is a problem with the conversation. For example, a period of non-communication that is outside of normal conversation transitions may indicate that a user 102 does not understand what the contact center agent 131 is saying.

Alternatively, a long period of non-communication may be appropriate based on the event associated with the communication. For example, if the event is the detection of the phrase "could you reset your cable modem," the threshold for the period of non-communication could be four minutes. In this example, the communication analyzer 122 can take into account some idle conversation when determining the threshold. For example, there could be several periods of non-communication along with idle conversation in between, which total close to four minutes. In addition, other sounds, such as, typing, rustling of papers, moving of chairs, dogs barking, and/or the like will be defined as non-communication sound.

The period of non-communication may be based on a specific party to the electronic voice communication session. If there are two parties (the user 102 and the contact center agent 131) on the electronic voice communication session, the event may be specific to the user 102 or the contact center agent 131A. For example, based on prior history of previous calls, when a call comes in for billing, successful calls show that the periods of non-communication are typically are about 2-1 of where the contact center agent 131 is silent about twice as long as the customer during the call (i.e., the contact center agent 131 is listening to the user 102 more than speaking). Conversely, when the contact center agent 131 is doing most of the talking in the electronic voice communication session, the user 102 is typically unsatisfied. Based on this model, detection of longer periods of non-communication for the contact center agent 131 versus shorter periods of non-communication for the user 102 would typically be considered appropriate behavior for the contact center agent 131.

The period of non-communication can apply to a conference call where there are three or more parties. For example, the period of non-communication can apply individual parties, some of the parties, or all the parties on the conference call. In this embodiment, voice and/or facial recognition may be used to identify one or more of the parties in the conference call. For example, if users 102A and 102B are on a conference call with the contact center agent 131A, the system may identify the user 102B as a decision maker (based on voice recognition or conversation in the conference call). The period of non-communication may apply specifically to the decision maker based on one or more defined rules of the template 123.

In one embodiment, the period of non-communication may be for parties in a group. For example, if the period of non-communication is 40 seconds, each member of the group must speak within the 40 second period. These types of periods of non-communication can be defined in the template 123.

The communications analyzer 122 determines if the threshold for the period of non-communication has been met in step 212. If the period for the threshold has been met in step 212, the communications analyzer 122 flags the period of non-communication in step 216. The flagged period of non-communication can then be used for further analysis of the electronic voice communication session. For example, the flagged period of non-communication can be used in a performance evaluation of the contact center agent 131. After flagging the period of non-communication in step 216, the process goes back to step 204.

If the threshold has not been met in step 212, the communications analyzer 122 determines if the monitoring period has ended in step 214. Typically, an event will have a monitoring period where the communications analyzer 122 monitors for the period of non-communication. For example, if the event is the detection of music on hold, the monitoring period will be until the music on hold has ended. The monitoring period may be based on the duration of the electronic voice communication session. Alternatively, the monitoring period may be based on a time period or detection of another event. If the monitoring period has not ended in step 214, the process goes to step 210. Otherwise, if the monitoring period has ended in step 214, the process goes to step 204.

To illustrate, consider the following examples. Assume that the user 102N has called the contact center agent 131N to establish a video communication (step 202) to discuss purchasing Product Y. The event is the detection of the user 102N walking away from the communication endpoint 101N and the threshold for the period of non-communication is three seconds. As the user 102N discusses Product Y with the contact center agent 131N, the contact center agent 131N ignores the user 102N's request to discuss Product Y in favor of Product Z, which is much more expensive (giving the contact center agent 131N a higher commission). The user 102N becomes frustrated because the contact center agent 131N is not listening to the user 102N. The user 102N gets up and walks away from the communication endpoint 101, resulting in a period of non-communication longer than three seconds for the user 102N (even though the contact center agent 131N is still talking). This event of the user 102N walking away from the communication endpoint 101N is detected in step 204. The period of non-communication for the user 102N is longer than the threshold of three seconds. The communications analyzer 122 determines that the threshold defined in the template 123 has been met in step 212. The event is flagged in step 216.

In a second example, assume that a voice call between the user 102A and the contact center agent 131A has been established to discuss the user's 102A's problem with Product A. The contact center agent 131A reads from a script to the user 102A in regard to specific responses from the user 102A. The event is when the contact center agent 131A asks the user 102A to go to a specific menu to configure Product A (part of the script). From previous interactions with customers, there is always a quick response to this step. The threshold in this case is that there should be only limited periods of non-communication as communication transitions between the user 102A and the contact center agent 131A because of the simplicity of the instructions.

However, in this case, the customer pauses for a period of time, prompting the contact center agent 131A to explain the question. The customer again pauses. In this example, there have been two unexpected pauses between transitions, indicating that the customer for some reason does not understand. The pauses may indicate that the contact center agent 131 may have skipped part of the script or did not explain the question properly. The communications analyzer 122 determines in step 212 that the threshold has been met and the periods of non-communication are flagged in step 216. The conversation between the contact center agent 131A and the user 102A can then be reviewed as part of a performance evaluation to determine if the contact center agent 131A can make improvements in handling customers in the future.

Figure 3:
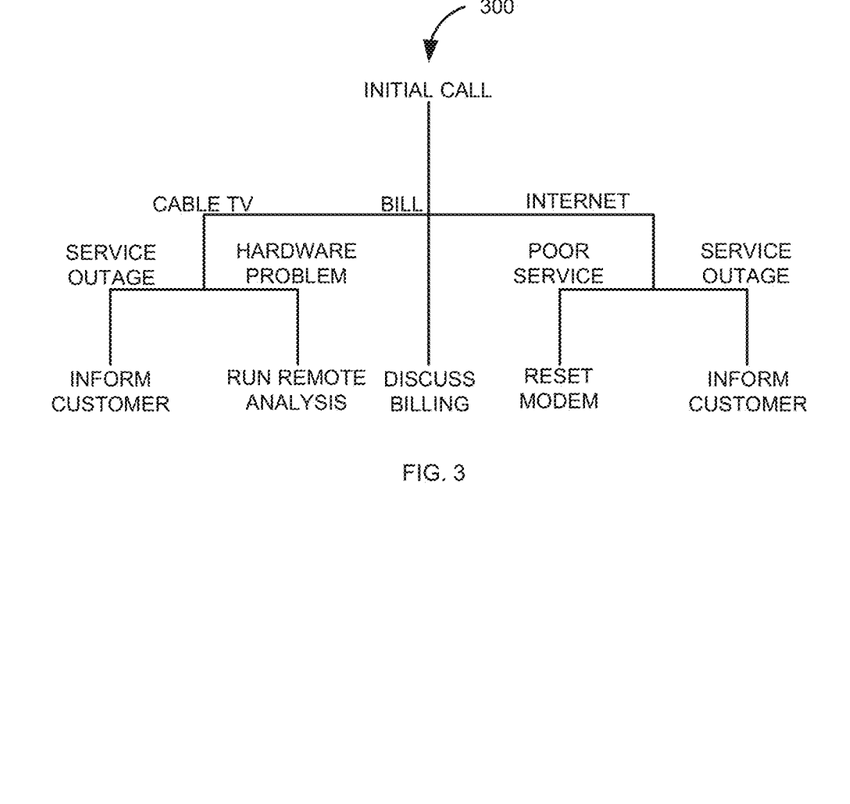
FIG. 3 is a diagram of an exemplary call progression tree.

FIG. 3 is a diagram of an exemplary call progression tree 300 for handling voice calls in regard for a cable/Internet provider. When the initial call is received, the contact center agent 131 or an IVR asks the user 102 questions, causing the progress of the call to flow to specific paths. For example, if the user 102 responds to an IVR prompt that he is calling in regard to Internet service, the user 102 is connected to the contact center agent 131. When the user 102 is connected to the contact center agent 131, the contact center agent 131 is presented with a call progression screen. In this example, the call progression screen is to ask if there is a poor service or a service outage (the user 102 is not getting Internet service). If the user 102 answers poor service, the contact center agent 131 is presented with a second call progression screen that requests the contact center agent 131 to tell the customer to reset their cable modem to help diagnose the problem.

The template 123 can be for a call progression tree 300. For example, the template 123 can be based on each branch of the call progression tree 300. Depending on how the call progresses, different events for each branch of the call progression tree 300 can define if there are expected periods of non-communication or not for each branch. To further illustrate, consider the example in FIG. 4.

Figure 4:
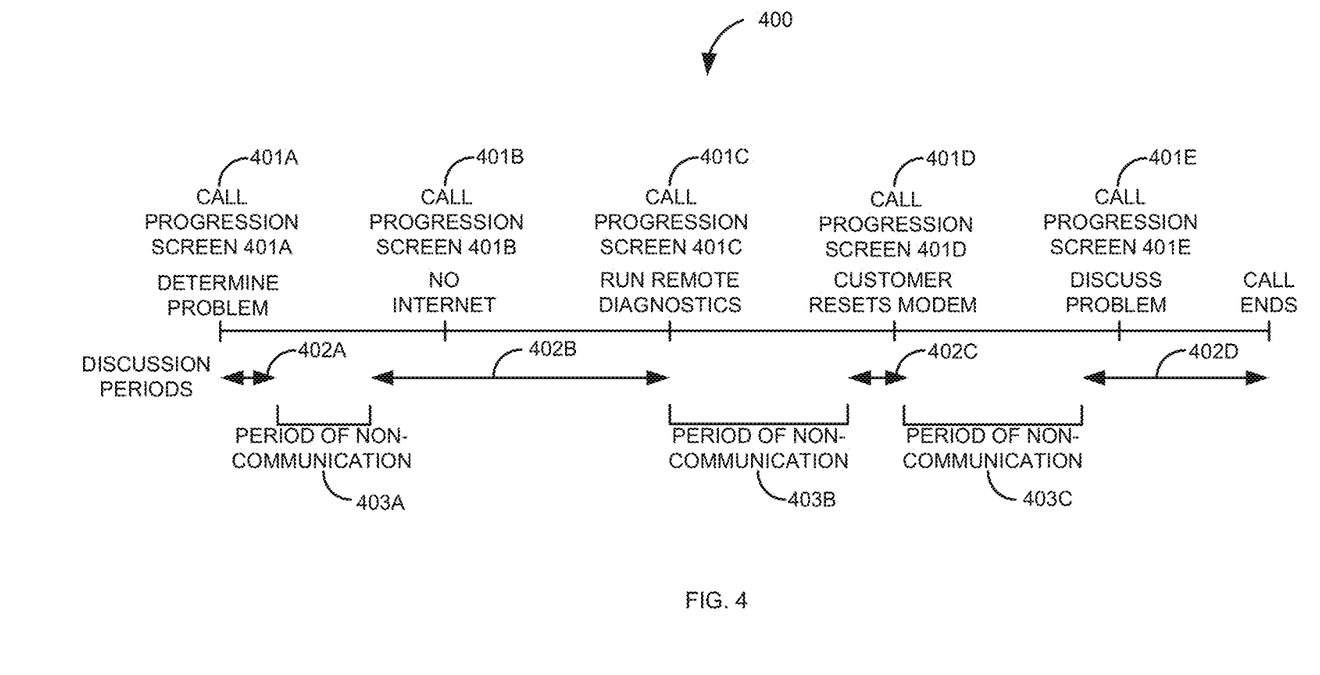
FIG. 4 is a diagram of an exemplary call flow through a call progression tree.

FIG. 4 is a diagram of an exemplary call flow 400 through a call progression tree 300. In this exemplary embodiment, additional branches are shown to better illustrate call progression through the call progression tree 300. Each branch of the call progression tree 300 has different call progression screens 401A-401E that are displayed to the contact center agent 131 as the call progresses. When the call is received, the contact center agent 131 is presented with the call progression screen 401A, which has some initial questions to ask the user 102. The contact center agent 131 discusses with the user 102 to determine the problem in discussion period 402A. There is then a period of non-communication 403A where there is no discussion between the contact center agent 131 and the user 102. The discussion then resumes in discussion period 402B.

For call progression screen 401B (no Internet) there is the second portion of discussion period 402B. For the call progression screen 401C (run remote diagnostics) there is a period of non-communication 403B along with part of the discussion period 402C. For the call progression screen 401D (customer resets modem), there is the second portion of the discussion period 402C along with a period of non-communication 403C and a portion of the discussion period 402D. For the call progression screen 401E (discuss problem), there is a second portion of discussion period 402D.

In this embodiment, each of the call progression screens 401A-401E are separate events in the template 123 used for the call progression tree 300. The period for monitoring each event is until the next call progression screen 401 is displayed. In this example, there are five events for the five call progression screens 401A-401E with a monitoring period until the next call progression screen 401 is displayed to the contact center agent 131 (with the exception of the call progression screen 401E that ends when the call ends). The events for call progression screens 401A, 401B, and 401E require that there not are any periods of non-communication other than the regular transition of conversation between the contact center agent 131 and the user 102. However, the period of non-communication 403A is over the threshold and the period of non-communication 403A is flagged by the communications analyzer 122.

The events for call progression screens 401C and 401D are defined in the template 123 as allowing for longer periods of non-communication based on the context (running remote diagnostics and resetting the modem). The longer periods of non-communication 403B and 403C are below the thresholds for each event respectively and are not flagged by the communications processor 122. Thus, only one period of non-communication (403A) is flagged during this particular series of call progression screens 401A-401E.

Figure 5:
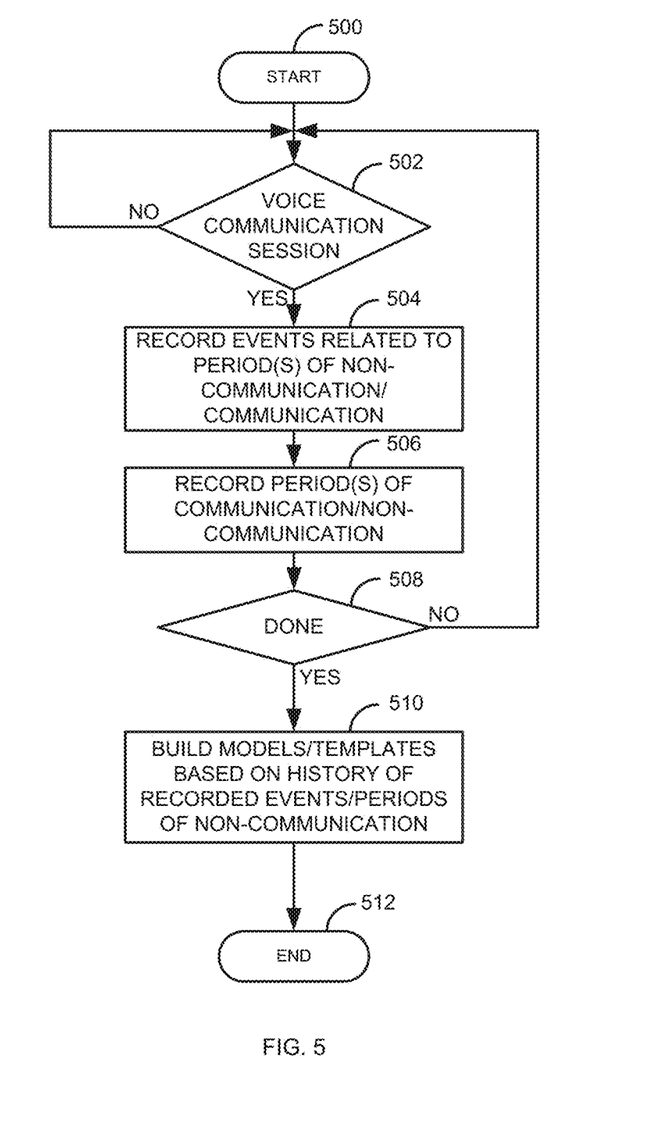
FIG. 5 is a flow diagram of a process for building templates based on prior communication sessions.

FIG. 5 is a flow diagram of a process for building templates 123 based on prior communication sessions. The process starts in step 500. The process determines if an electronic communication session has been established in step 502. If an electronic communication session has not been established in step 502, the process repeats step 502.

Otherwise, if the electronic communication session has been established in step 502, the event detector 121 records events that are related to periods of non-communication and/or periods of communication in step 504. The events that are recorded may be defined based on one or more rules. The events are recorded in the previous call history 124.

The communication analyzer 122 records detected periods of non-communication during the electronic communication session in step 506. The detected periods of non-communication are recorded in the in the previous call history 124. The periods of non-communication that are recorded may be based on one or more rules. For example, the periods of non-communication may only be where no party is speaking and/or an individual party (or parties) is not speaking, moving, not moving their lips, or a combination thereof.

The process determines in step 508 if the communication analyzer 122 is done analyzing electronic voice communication sessions in step 508. If the communications analyzer 122 is not done analyzing electronic voice communication sessions in step 508, the process goes to step 502. Otherwise, if the communications analyzer 122 is done analyzing the electronic voice communication sessions in step 508, the communications analyzer 122 builds models/templates 123 based on the history of recorded events/periods of non-communication in step 510. The process then ends in step 512.

The above process may be used to build up statistics over a long period of time. For example, the process of FIG. 5 could be used to gather statistics of calls of contact center 120 over a period of several years. As additional statistics are gathered during this period, the models can be incrementally refined based on the larger sample of calls.

For example, consider an example using the call progress tree described previously in FIGS. 3 and 4. Electronic voice communications sessions for each branch of the call progress tree 300 can be monitored. The detected events are when a new call progression screen 401 is presented to the contact center agent 131. For each period between call progress screens 401, the period is monitored for periods of communication/non-communication to build a model. This is repeated for a series of calls to build a model for each branch of the call progression tree 300 that is similar to what was described in FIG. 4.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A system comprising:
a microprocessor; and
a computer readable medium, coupled with the microprocessor and comprising microprocessor readable and executable instructions that program the microprocessor to execute:
an event detector that detects an event associated with an electronic communication session between a first party at a first communication endpoint and a second party at a second communication endpoint, wherein the detected event is a specific call progression screen being presented to a contact center agent; and
a communications analyzer that analyzes the electronic communication session for a period of non-communication that meets a defined threshold and flags the period of non-communication in response to analyzing the electronic communication session for the period of non-communication that meets the defined threshold.

2. The system of claim 1, wherein the period of non-communication is one of:
a non-communication of the first party;
a non-communication of the second party;
a non-communication of both the first party and the second party for a period of time; or
a non-communication for at least one party of a group for a period of time.

3. The system of claim 1, wherein the event further comprises at least one of:
detection of a word or phrase spoken by the first or second party in the electronic communication session;
a point in a script being followed by a contact center agent;
detection of the second party being placed on hold;
detection of music on hold;
detection of the first or second party muting their telephone;
detection of the electronic communication being transferred from the second party to a third party;
detection of the second party walking away from a video phone;
detection of the second party not moving their lips; or
a gesture detected in a video portion of the electronic communication session.

4. The system of claim 1, wherein electronic communication session comprises at least a third party conferenced with the second party and wherein the period of non-communication is based on an individual one of the second party and the at least third party.

5. The system of claim 1, wherein the threshold is defined based on a plurality of previous electronic communication sessions that include the event.

6. The system of claim 1, wherein the defined threshold is a plurality of defined thresholds in a template for a call progression tree of an agent script that includes a plurality of events for branches in the call progression tree.

7. The system of claim 1, wherein the second party is a non-human entity.

8. The system of claim 1, wherein the period of non-communication comprises a non-voice sound.

9. The system of claim 1, wherein the period of non-communication is used in a performance evaluation for a contact center agent.

10. A method comprising:
detecting, by a processor, an event associated with an electronic communication session between a first party at a first communication endpoint and a second party at a second communication endpoint, wherein detecting of the event is detection of a specific call progression screen being presented to a contact center agent;
analyzing, by the processor, the electronic communication session for a period of non-communication that meets a defined threshold; and
in response to analyzing the electronic communication session for the period of non-communication that meets the defined threshold, flagging, by the processor, the period of non-communication.

11. The method of claim 10, wherein the period of non-communication is one of:
a non-communication of the first party;
a non-communication of the second party;
a non-communication of both the first party and the second party for a period of time; or
a non-communication for at least one party of a group for a period of time.

12. The method of claim 10, wherein the event further comprises one of:
detection of a word or phrase spoken by the first or second party in the electronic communication session;
a point in a script being followed by a contact center agent;
detection of the second party being placed on hold;
detection of music on hold;
detection of the first or second party muting their telephone;
detection of the electronic communication being transferred from the second party to a third party;
detection of the second party walking away from a video phone;
detection of the second party not moving their lips; or
a gesture detected in a video portion of the electronic communication session.

13. The method of claim 10, wherein electronic communication session comprises at least a third party conferenced with the second party and wherein the period of non-communication is based on an individual one of the second party and the at least third party.

14. The method of claim 10, wherein the threshold is defined based on a plurality of previous electronic communication sessions that include the event.

15. The method of claim 10, wherein the defined threshold is a plurality of defined thresholds in a template for a call progression tree of an agent script that includes a plurality of events for branches in the call progression tree.

16. The method of claim 10, wherein the period of non-communication comprises a non-voice sound.

17. The method of claim 10, wherein the period of non-communication is used in a performance evaluation for a contact center agent.

18. The method of claim 10, wherein the event further comprises one of: detection of the second party walking away from a video phone or detection of the second party not moving their lips.

19. The method of claim 10, wherein the event further comprises one of: detection of the second party being placed on hold or detection of music on hold.

20. The method of claim 10, wherein the period of non-silence is based on a previous call history of non-communication during a time when the specific call progression screen is presented to the contact center agent.

* * * * *

UNITED STATES PATENT AND TRADEMARK OFFICE
CERTIFICATE OF CORRECTION

PATENT NO. : 9,602,666 B2
APPLICATION NO. : 14/682312
DATED : March 21, 2017
INVENTOR(S) : Keith Ponting, Wendy J. Holmes and David Skiba It is certified that error appears in the above-identified patent and that said Letters Patent is hereby corrected as shown below:

At Column 9, Line 40, please delete "at least" therein.

Signed and Sealed this
Thirteenth Day of June, 2017

Joseph Matal
*Performing the Functions and Duties of the
Under Secretary of Commerce for Intellectual Property and
Director of the United States Patent and Trademark Office*